(12) United States Patent
Mouchet

(10) Patent No.: US 9,539,866 B2
(45) Date of Patent: Jan. 10, 2017

(54) HIGH VOLUME VEHICLE INSPECTION SYSTEM AND METHODS

(71) Applicant: ATEQ Corporation, Livonia, MI (US)

(72) Inventor: Jacques Mouchet, Shanghai (CN)

(73) Assignee: ATEQ CORPORATION, Livonia, MI (US)

(*) Notice: Subject to any disclaimer, the term of this patent is extended or adjusted under 35 U.S.C. 154(b) by 0 days.

(21) Appl. No.: 14/067,063

(22) Filed: Oct. 30, 2013

(65) Prior Publication Data

US 2014/0129076 A1 May 8, 2014

Related U.S. Application Data

(60) Provisional application No. 61/721,761, filed on Nov. 2, 2012.

(51) Int. Cl.
*B60C 23/04* (2006.01)
*G07C 5/08* (2006.01)
(Continued)

(52) U.S. Cl.
CPC ............. *B60C 23/04* (2013.01); *B60C 11/246* (2013.04); *B60C 23/0479* (2013.01);
(Continued)

(58) Field of Classification Search
None
See application file for complete search history.

(56) References Cited

U.S. PATENT DOCUMENTS 4,398,172 A * 8/1983 Carroll ................... G07B 15/00
250/338.1
4,642,783 A 2/1987 Alexander et al.
(Continued)

FOREIGN PATENT DOCUMENTS

DE 10050984 A1 5/2002
DE 102010026729 A1 1/2012
(Continued)

OTHER PUBLICATIONS

JP2008100613—translate.pdf : Translation of Toyofuku JP2008100613.*
(Continued)

*Primary Examiner* — Rami Khatib
*Assistant Examiner* — Jeffrey Boomer
(74) *Attorney, Agent, or Firm* — Young Basile Hanlon & Macfarlane, P.C.

(57) ABSTRACT

An inspection system for use in measuring several vehicle conditions in a high volume vehicle inspection line. A plurality of sensors are installed on a vehicle for measuring a plurality of vehicle conditions to assist in the rapid evaluation of critical vehicle conditions or parameters. At least one tool is positioned along a vehicle path in a monitoring station. As the vehicle passes through the monitoring station, the tool received electronic data from the plurality of sensors and displays one or more signals to alert an inspector of acceptable or unacceptable vehicle conditions. In one example, the plurality of sensors includes tire pressure monitoring system (TPMS) data from the vehicle tires to rapidly assess the condition of the tire air pressure and other monitored tire conditions.

8 Claims, 5 Drawing Sheets

(51) Int. Cl.
*G08G 1/017* (2006.01)
*B60C 11/24* (2006.01)
*G07C 5/00* (2006.01)

(52) U.S. Cl.
CPC ......... *G07C 5/0808* (2013.01); *G08G 1/0175* (2013.01); *G07C 5/008* (2013.01)

(56) References Cited

U.S. PATENT DOCUMENTS

| | | | |
|---|---|---|---|
| 4,873,654 A | 10/1989 | Alexander et al. | |
| 4,904,939 A | 2/1990 | Mian | |
| 4,967,485 A | 11/1990 | Brown et al. | |
| 5,608,376 A | 3/1997 | Ito et al. | |
| 6,237,723 B1 | 5/2001 | Salsman | |
| 6,441,732 B1* | 8/2002 | Laitsaari et al. | 340/539.1 |
| 6,505,507 B1* | 1/2003 | Imao et al. | 73/146.5 |
| 6,612,165 B2* | 9/2003 | Juzswik et al. | 73/146.5 |
| 6,718,818 B2 | 4/2004 | Dutt et al. | |
| 6,804,999 B2* | 10/2004 | Okubo | 73/146 |
| 6,826,951 B1* | 12/2004 | Schuessler et al. | 73/146 |
| 6,904,796 B2 | 6/2005 | Pacsai et al. | |
| 6,931,744 B1 | 8/2005 | Ikerd, Jr. et al. | |
| 6,980,115 B2 | 12/2005 | Deniau | |
| 7,040,151 B2 | 5/2006 | Graham et al. | |
| 7,119,661 B2 | 10/2006 | Desai et al. | |
| 7,225,666 B2 | 6/2007 | Welch et al. | |
| 7,250,852 B1 | 7/2007 | Kell | |
| 7,564,344 B2 | 7/2009 | Deniau et al. | |
| 7,589,619 B2 | 9/2009 | DeKeister et al. | |
| 7,623,021 B2 | 11/2009 | Desai et al. | |
| 7,688,192 B2 | 3/2010 | Kenny et al. | |
| 7,694,557 B2 | 4/2010 | Hettle et al. | |
| 7,734,391 B2 | 6/2010 | Deniau et al. | |
| 7,797,995 B2 | 9/2010 | Schafer | |
| 7,810,390 B2 | 10/2010 | Hettle et al. | |
| 7,845,091 B2 | 12/2010 | Clark | |
| 7,924,148 B2 | 4/2011 | Costello et al. | |
| 7,944,346 B2 | 5/2011 | De Castro et al. | |
| 8,035,499 B2 | 10/2011 | Kochie et al. | |
| 8,220,324 B2 | 7/2012 | Kokubu et al. | |
| 8,230,689 B2 | 7/2012 | Kmetz et al. | |
| 8,502,655 B2 | 8/2013 | Deniau et al. | |
| 8,576,060 B2 | 11/2013 | Deniau et al. | |
| 8,674,821 B2 | 3/2014 | Togawa | |
| 2002/0130771 A1* | 9/2002 | Osborne et al. | 340/438 |
| 2002/0149477 A1 | 10/2002 | Desai et al. | |
| 2003/0048178 A1* | 3/2003 | Bonardi et al. | 340/442 |
| 2003/0145650 A1* | 8/2003 | Juzswik et al. | 73/146 |
| 2004/0150369 A1 | 8/2004 | Deniau | |
| 2004/0164140 A1* | 8/2004 | Voeller et al. | 235/375 |
| 2004/0236485 A1 | 11/2004 | Deniau et al. | |
| 2005/0132792 A1* | 6/2005 | Lemense et al. | 73/146.4 |
| 2005/0134428 A1 | 6/2005 | Desai et al. | |
| 2005/0162263 A1* | 7/2005 | Fennel et al. | 340/442 |
| 2006/0025897 A1* | 2/2006 | Shostak et al. | 701/1 |
| 2006/0049915 A1 | 3/2006 | Deniau et al. | |
| 2006/0211410 A1 | 9/2006 | Deniau et al. | |
| 2006/0261933 A1 | 11/2006 | Deniau et al. | |
| 2007/0069877 A1* | 3/2007 | Fogelstrom | 340/442 |
| 2007/0090919 A1 | 4/2007 | Desai et al. | |
| 2007/0090928 A1* | 4/2007 | Deniau et al. | 340/10.52 |
| 2007/0193349 A1 | 8/2007 | Petrucelli | |
| 2008/0133081 A1* | 6/2008 | Colarelli et al. | 701/34 |
| 2008/0164988 A1* | 7/2008 | DeKeuster et al. | 340/442 |
| 2008/0173082 A1 | 7/2008 | Hettle et al. | |
| 2008/0202659 A1 | 8/2008 | Hettle et al. | |
| 2008/0204217 A1 | 8/2008 | Costello et al. | |
| 2008/0205553 A1 | 8/2008 | Costello et al. | |
| 2008/0266068 A1 | 10/2008 | Farrell et al. | |
| 2008/0302425 A1 | 12/2008 | Hettle et al. | |
| 2009/0000311 A1 | 1/2009 | Kmetz et al. | |
| 2009/0033478 A1 | 2/2009 | Deniau et al. | |
| 2009/0309709 A1* | 12/2009 | Bevacqua et al. | 340/426.18 |
| 2011/0106464 A1* | 5/2011 | Petrucelli | 702/50 |
| 2011/0140876 A1 | 6/2011 | Deniau | |
| 2011/0205047 A1* | 8/2011 | Patel et al. | 340/447 |
| 2011/0221587 A1* | 9/2011 | Katou | 340/443 |
| 2011/0257817 A1 | 10/2011 | Tieman | |
| 2012/0117788 A1 | 5/2012 | Deniau et al. | |
| 2012/0119895 A1 | 5/2012 | Deniau et al. | |
| 2012/0185110 A1 | 7/2012 | Deniau et al. | |
| 2012/0197873 A1* | 8/2012 | Uramoto et al. | 707/722 |
| 2012/0232753 A1* | 9/2012 | Lhuillier | B60C 23/0479 701/36 |
| 2012/0302191 A1 | 11/2012 | Farrell et al. | |
| 2012/0323690 A1* | 12/2012 | Michael | 705/14.58 |
| 2013/0038440 A1 | 2/2013 | Deniau et al. | |
| 2013/0038441 A1 | 2/2013 | Deniau et al. | |
| 2013/0038442 A1 | 2/2013 | Deniau et al. | |
| 2013/0038443 A1 | 2/2013 | Deniau et al. | |
| 2013/0158777 A1 | 6/2013 | Brauer et al. | |
| 2013/0282231 A1* | 10/2013 | Farr et al. | 701/34.4 |
| 2014/0039752 A1 | 2/2014 | Juzswik | |
| 2014/0195099 A1* | 7/2014 | Chen | 701/29.6 |
| 2014/0308971 A1* | 10/2014 | O'Brien et al. | 455/456.1 |
| 2016/0236522 A1* | 8/2016 | Taki | G01M 17/02 |

FOREIGN PATENT DOCUMENTS

| | | |
|---|---|---|
| EP | 1769948 A2 | 4/2007 |
| EP | 1972468 A1 | 9/2008 |
| EP | 2777957 A2 * | 9/2014 |
| GB | 2429819 A * | 3/2007 |
| JP | 2008100613 A * | 5/2008 |
| WO | 9308035 | 4/1993 |
| WO | 0236368 A1 | 5/2002 |
| WO | 2008000491 A1 | 1/2008 |
| WO | 2010115390 A1 | 10/2010 |

OTHER PUBLICATIONS

Jacques Mouchet, ATEQ User Manual ATEQ VT 55, Retrieved on Jan. 10, 2013 from the Internet: www.orange-electronic,com/en/products/oe_sensor/VT55d-UOS.pdf, Nov. 1, 2009, pp. 1-38.
Vitale et al., A Dry Air Leak Test Primer, Jun. 1, 2006, Quality First Systems, Inc.
Doran 360 CE Tire Pressure Monitoring Brochure, Sep. 13, 2012, Doran Manufacturing, LLC, www.DORANMFG.com.
European Intellectual Property Office, European Search Report, dated Dec. 20, 2013.
European Intellectual Property Office, European Search Report, dated Mar. 12, 2014.

* cited by examiner

HIGH VOLUME VEHICLE INSPECTION SYSTEM AND METHODS

CROSS REFERENCE TO RELATED APPLICATION

This application claims priority benefit to U.S. Provisional Patent Application No. 61/721,761 filed Nov. 2, 2012, the contents of which is incorporated herein by reference in its entirety.

TECHNICAL FIELD

The present invention is in the general field of monitoring and inspecting vehicle data and other conditions on vehicles.

BACKGROUND

In 2007, the United States implemented federal laws requiring most passenger vehicles to include a tire pressure monitoring system (TPMS) to monitor and alert drivers of low tire pressure which degrades vehicle efficiency and performance. Continued use of a tire with low tire pressure can cause premature wear of the tire and in the worst case, catastrophic tire failure.

One TPMS system is so-called direct TPMS. In direct TPMS, a tire sensor is installed in the wheels of each pneumatic vehicle tire, often on the valve stem. These sensors are capable of monitoring several conditions of the tire including: tire air pressure, tire temperature, wheel rotation speed and other conditions. The sensors themselves include a specific sensor identification code (ID) and are capable of receiving external electronic signals from an electronic control unit or module (ECU) in the vehicle, and in response, sending electronic signals wirelessly from inside the wheel to the vehicle ECU, which typically is connected to alert indications in the instrument panel in the interior of the passenger compartment. If a wheel sensor senses a tire pressure or other condition in a tire that is above or below a predetermined level, the sensor transmits a signal that is received by the ECU, and the ECU triggers an audio/visual indication to alert the driver to the condition. The sensors are similarly capable of receiving external electronic signals from an external TPMS monitoring tool and sending the electronic signals wirelessly from inside the wheel to the external tool.

Typical tire sensors used with TPMS systems are mounted on the valve stem or are strapped on the rim, although they could also be mounted against the tire wall, for example. An electronic module generally includes a small battery, a circuit board with communication antennas or coils (receive and transmit), an air pressure sensor, a temperature sensor, a rotation detection device or accelerometer, a programmable controller and a memory for storing the sensor specific ID and other information depending on the TPMS system and capabilities. Modules that do not include a battery are under development. Due to the installation inside the tire or valve stem, sensors are designed to be permanently installed within the tire. Due to the finite life of batteries, power consumption is purposely low and the sensors are initially placed in a "sleep" mode so as to not use power until the vehicle or individual wheel is installed or sold to an end user. During operation of the vehicle in the field, it is common for the sensors to not be active or continuously reporting information to the vehicle ECU or continuously transmitting for receipt by an external TPMS tool, but rather to perform tire condition checks at predetermined intervals to conserve battery life. Therefore, it is often necessary to awaken or active a TPMS wheel sensor to receive data from the sensor on the condition of the tire. When activated, the sensors emit a signal or signals which are received and interpreted by the ECU or a nearby external TPMS tool and processed according to preprogrammed instructions.

External TPMS tools and devices have been deployed in high volume to communicate with vehicle TPMS wheel sensors and ECUs in new vehicle manufacturing plants. In one example, a TPMS tool unit is placed on each side of an assembly line, typically near the end where completed or near completed vehicles pass, to awaken the TPMS wheel sensors and communicate with the ECU to ensure that the TPMS system was installed and is operating as designed when the vehicle leaves the plant and is transported for sale in the field. An example of one system is the ATEQ model VT520 manufactured by ATEQ Corp. which is the assignee of the present invention which is incorporated herein by reference. These prior systems have several limitations including, but not limited to, limited capability to recognize or read a small number of different tire sensors, are typically limited to variables/information relating only to the tire or sensor itself (air pressure, temperature, sensor battery life etc.) and they do not track or store historical data on a particular tire sensor, tire or vehicle. These systems further are designed primarily for indoor, controlled environments, for example in enclosed assembly facilities.

In many industries or fields, for example managing a fleet of hundreds of rental cars or taxis in a major city, it is important for an efficient fleet to maintain proper tire pressure to keep the vehicles in service as much as possible. It would be very disadvantageous for customers of, for example, rental cars to require road service or return the vehicle because of low tire pressure during the rental period. Equally, customers of rental cars may not respond to a low tire pressure condition as they normally would with their own vehicles, and drive on low air pressure which may result in an unsafe driving condition or may damage the tire and other vehicle systems costing the rental car company money to repair the rental car and place the rental car back into the fleet for use.

In such rental car and taxi industries, it is common for companies to manually check the tire air pressure of each tire every time a vehicle is returned from use to ensure that it is ready to be returned to the fleet for use. In high volume car rental businesses at major airports or taxi companies in major cities, hundreds of vehicles a day may be rented and returned or undergo shift changes by the taxi drivers. At rental car facilities, often one or more individuals will be required full time to manually check the tire pressure and other vehicle conditions prior to a rental car leaving the facility and/or when it is returned so the vehicle can quickly be placed back into the fleet for use.

Further, it is known that, for example, rental cars are often subject to abuse and theft in a number of ways while out in the field. For example, new tires on a rental car may be stolen/removed by a thief or crime organization and replaced with a worn set of tires before the vehicle is returned to the rental company. The stolen new tires, along with the TPMS wheel sensors, are then sold for a profit. Removal and resale of the TPMS wheel sensors, which are not visible unless the tire is removed, go undetected by the rental company when the vehicle is initially returned, and it can cost the rental company hundreds of dollars to replace and reinstall a new sensor once the theft is detected.

Relatively high volumes of vehicles can also be experienced by quick lube/oil change/repair facilities where vehicles are only in a facility for 10-15 minutes and a facility may have multiple bays or lanes to service multiple vehicles at the same time. It is common for these facilities to provide quick inspection of important vehicle systems, for example tire air pressure, other vital fluids, vehicle mileage and other systems.

It would be advantageous to create systems and processes to monitor or inspect selected vehicle tire conditions in a high volume throughput environment to improve on the present, highly labor intensive process of checking tire air pressure and other conditions, as well as deterring theft or abuse of tires and related equipment.

BRIEF SUMMARY

The present invention provides examples of improvements to existing TPMS tools including additional components, features, functions and methods of operation described below. The present invention is particularly advantageous in high volume applications where vehicles require a level of inspection in order to ensure the vehicle is ready for service and to promptly detect vehicle abuse, damage or theft.

In one example, a TPMS system is installed along a vehicle passageway where a high volume of vehicles may slowly pass and whereby preselected tire conditions are checked through use of the tool.

In one example, a TPMS tool is placed along each side of a vehicle passageway. The TPMS tool communicates with the TPMS sensor in each wheel that passes through a signal beam of the tool thereby activating the TPMS sensor which in turn sends tire condition data, for example tire air pressure, to the tool which detects and alerts a technician of acceptable or unacceptable conditions of the tire, for example low air pressure. If the tire conditions checked fall within acceptable predetermined standards, the vehicle can continue along for further inspection or be returned to the fleet for use. Identification of an unacceptable condition is immediately brought to the attention of the technician and can be remedied. In the example of theft or damage, the company can address the problem with the user avoiding loss by the company.

In another example, the TPMS tool may be equipped with or can be used with other sensors, for example an optical sensor or scanner to read or identify the specific vehicle identification number (VIN), license plate number or other vehicle or equipment identification tags or labels. Other examples of sensors may also be used to check other vehicle system conditions, for example vital vehicle fluid levels and internal components subject to wear, and enhance the evaluation of the tire conditions. For instance, in another example, the TPMS tool may be equipped or used with a sensor to evaluate the tire tread condition or profile to further inspect the tire condition and/or identify abuse or theft of tires and equipment that was installed on the vehicle prior to the last field use.

In another example, a monitoring/recording device is placed in and/or installed on the vehicle to periodically read, or continuously monitor in real time, vehicle data, for example tire air pressure and vital fluid levels. On the vehicle entering the inspection station, a station sensor sends a radio frequency (RF) or other signal to the on-board monitoring/recording device to retrieve the present and previously recorded data. In this example, since the vehicle inspection data is monitored in the onboard device, only one station sensor, or a fewer number of station sensors, is needed to retrieve the desired tire and/or other vehicle and system data.

BRIEF DESCRIPTION OF THE DRAWINGS

The description herein makes reference to the accompanying drawings wherein like reference numerals refer to like parts throughout the several views, and wherein.

DETAILED DESCRIPTION OF EXAMPLES OF THE INVENTION

Referring to FIGS. 1-5, examples of a high volume vehicle inspection system and methods are illustrated and described below.

Figure 1:
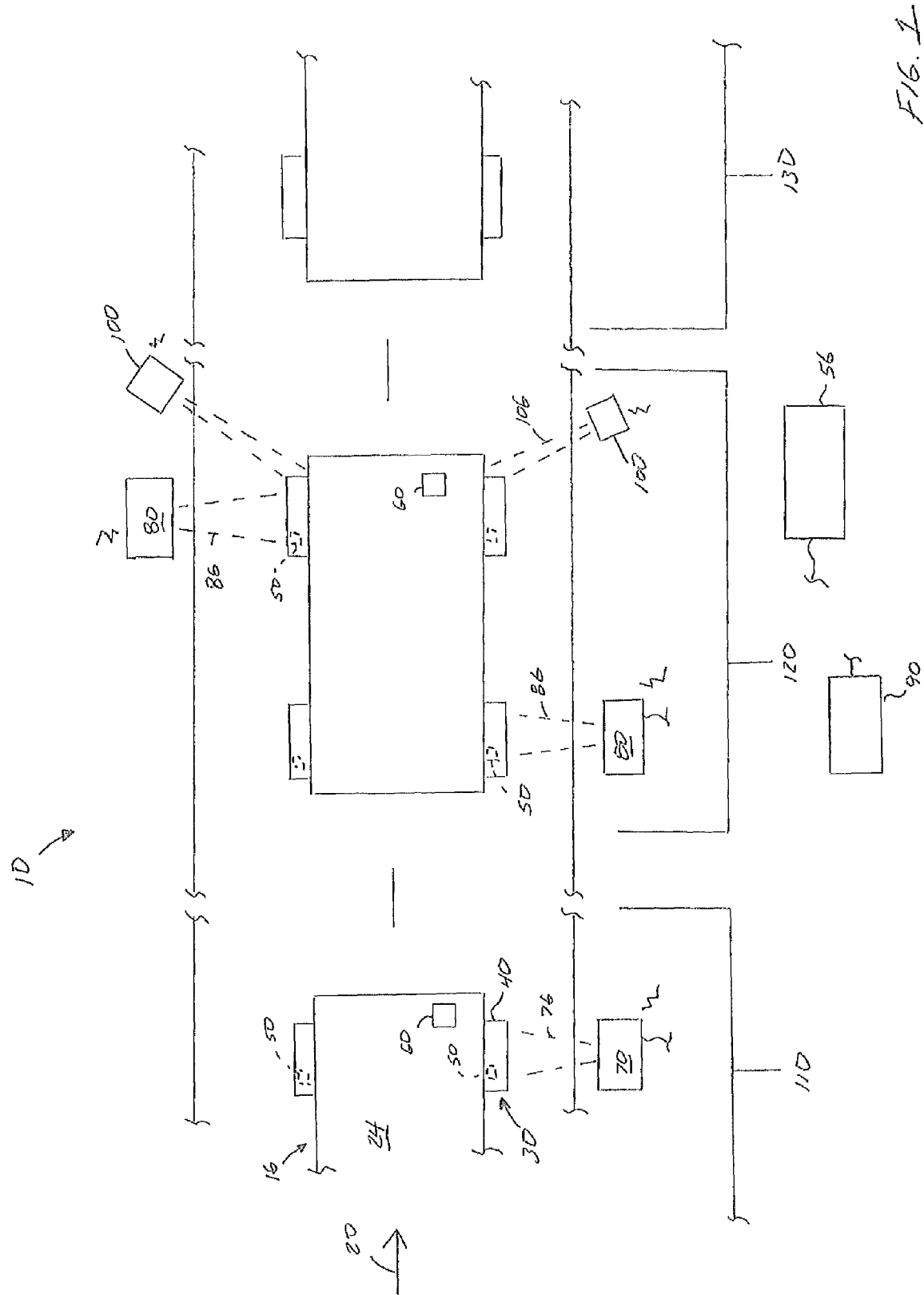
FIG. 1 is a schematic plan view of an example of a vehicle passageway using an example of the vehicle tire monitoring system.

Referring to FIG. 1, an example of a high volume vehicle tire inspection system 10 is shown. In the example, the inspection system 10 is used to inspect pneumatic tires on a vehicle 16 that is driven or otherwise passed through a discrete, predetermined path of travel 20, for example, a vehicle return lane at a car rental facility or taxi cab vehicle station or facility. It is understood that other applications known by those skilled in the art may be used where a relatively high volume of vehicles are inspected, or where minimal manual labor for the below-described inspections, is desired. For example, the system 10 could be employed for relatively high volume commercial fleet trucks and other devices used to transport persons or cargo. As use of tire monitoring tools become more widespread and costs to implement are reduced, the use of such devices will also expand. For example, it is contemplated system 10 may be used in high volume bicycle rental facilities and other such applications known by those skilled in the art.

In the example, vehicle 16 is a production passenger vehicle having a vehicle body 24 with four wheels and pneumatic tires 30, each tire 30 having a tread or profile 40. In the example, the vehicle 16 includes a tire pressure monitoring system (TPMS) which includes a wheel sensor 50 installed on the interior of each wheel or tire 30, often in the valve stem extending from the tire 30. As described above, the sensor 50 typically includes its own power source and is capable of receiving and transmitting data signals (continuous or pulsed) which can be read by the vehicle ECU or an external TPMS sensor 80 described below. Conventional wheel sensors 50 can measure a plurality of conditions including tire pressure, temperature, tire rotation and others. Sensors 50 typically communicate a specific sensor ID and the internal battery or power source life or status. Sensors are under continuous development and capabilities being increased, for example, sensors without a battery which are powered by motion, induction or other means.

In the example shown in FIG. 1, in an exemplary application in a vehicle rental return line having a return lane or path of travel 20, vehicles 16 are returned after use in the field, for example a week-long rental by an out-of-town traveler. The vehicle 16 may have experienced normal, uneventful wear however, the vehicle 16 may have experienced a harsh event. For example, one or more tires 30 may have hit a curb or large pothole, may have been punctured and started leaking air pressure or may have been subject to theft or abuse as described above. Under any of these conditions, rental facilities typically have only a few minutes to perform a cursory inspection of the vehicle 16 and tires 30 before the traveler/customer completes the return process and leaves the facility. Due to the high volume, it is most advantageous for the rental facility to place the vehicle 16 back into the fleet for use by another customer as soon as possible.

In the example, the returned vehicle 16 may enter a first station 110. In station 110, the vehicle is preferably positively identified to ensure the rental facility that this is the vehicle that was rented and, for example, not another rental agency's vehicle. One way to identify the vehicle is to scan or otherwise input the vehicle's identification number (VIN) which is specific to each vehicle manufactured regardless of make or model. The VIN number is a multi-digit, alphanumeric code typically placed inside the passenger compartment down toward the bottom of the windshield where it can be seen from the exterior of the vehicle, and is purposely placed and secured to make it difficult to remove or switch with another VIN. Preferably, the VIN number can be optically scanned and quickly recorded without manual input which would be slow and susceptible to human input error due to the alphanumeric nature of the code. In one method, a hand-held, portable scanner device (not shown) can be used by a technician to scan the VIN number and wirelessly send it to a central device or controller 56 to temporarily store the information for coordination with other data in the inspection described below or with previously stored data in a central database or other data repository for the rental facility.

In an alternate method shown in FIG. 1, the vehicle 16 can include a visual label or tag 60 which includes identification data which can be automatically scanned or optically read by a reader 70 stationarily positioned along the path of travel 20 as generally shown. The tag 60 can be a label with a bar or QR code, a radio frequency identification (RFID) tag or other device having indicia that can be quickly and electronically retrieved from the vehicle and transmitted to a controller 56 or other device for interpretation and processing. Other identification tags, vision systems, optical scanning and reading and optical character recognition devices and processes known by those skilled in the art may be used.

In the example shown, the tag 60 is positioned to necessarily pass through the vision or beam 76 as the vehicle travels through station 110 as generally shown. Preferably, the vehicle does not have to stop, but may continuously move through station 110 at an efficient rate of speed to maximize efficiency of the inspection. The scanned vehicle ID is electronically transferred to controller 56 for further use as described below. Alternately, the reader 70 can be positioned so the beam 76 necessarily passes over the tag 60 on the vehicle.

In an alternate example, other devices to positively identify the specific vehicle 16 may be used, for example scanning or reading the vehicle license plate, which can be cross-checked with stored data to ensure the vehicle identification and that the license plate has not been switched with another vehicle. This can be accomplished through conventional vision systems, cameras or other devices which can automatically interpret the data or through manual review by a human technician for positive verification, for example at a central monitoring station 90.

In the example shown in FIG. 1, a second station 120 sequentially follows first station 110. Preferably, after the vehicle 16 has been positively identified through reader 70, the TPMS tire sensors 50 are activated and by a TPMS tool 80 positioned on each side of the path of travel 20 as generally shown. In the example, and as further described above, each tool 80 sends a low frequency signal or beam 86 which awakens or activates an adjacent TPMS sensor 50 in each wheel as it passes through the beam 86. Depending on sophistication and capabilities of the tool 80 and sensor 50, data is transmitted by the sensor 50 and received by the adjacent tool 80 for analysis and further processing by the tool 80 or controller/processor 56 which is in electronic communication, preferably wireless, with each tool 80. An example of a tool 80 that has been employed in an indoor environment, and would require some modification, for example protection from exterior environment, is ATEQ model VT and VT520 manufactured by ATEQ Corp. which is the assignee of the present invention.

As described above, in a rental car facility application, tire air pressure is the most useful condition to be measured, however, many other conditions known by those skilled in the art can also be read from the sensor 50 or other sensors or monitors and processed by the tool 80 and controller/processor 56 depending on the needs of the facility. For example, where a vehicle is equipped with sensors for other vehicle systems, vital fluid levels, for example, engine oil, coolant and brake fluid may be wirelessly checked by system 10 using the TPMS tool 80 or other devices and processes in communication and used therewith. In the example, the tool 80 and fluid level sensors can communicate through radio frequency (FR) signals or through other communication methods known by those skilled in the art. Further, where additional vehicle sensors or monitors are employed, components subject to wear, for example brake pads may be read or signals received to further enhance the vehicle inspection process.

Using tire air pressure as an example only, on receipt of the transmitted tire pressure data for each tire 30 and respective sensor 50, various levels of analysis can take place to provide an indication if the tire is within a standard or acceptable pressure range to allow the vehicle 16 to be placed back into the fleet for service or whether the tire requires adjustment of the air pressure or further inspection before returning to service. For example, in a very simple system applying minimal analysis, the tool 80 or controller/processor 56 can have a preprogrammed acceptable range, for example tire pressure between 28-40 pounds per square inch (psi). If the received pressure from a tire sensor 50 falls within this range, a simple pass or clear indicator can displayed on the tool 80 or at a central monitoring station 90 in electronic communication with the reader 70, tool 80, central controller 56 and other equipment.

In a more sophisticated system 10, the sensor 50 specific ID can be read and the current pressure reading of the tire associated to that sensor can be compared to, for example, electronically stored prior or historical pressure measurements for that tire. This, for example, may provide an indication that a particular tire has a slow leak over the past few days, weeks or months requiring service of the tire. If historical pressure or other sensor-transmitted data shows a pattern of problems with a particular tire 30 or sensor 50, the problem can be identified and resolved increasing efficiency of the vehicle 16 for the fleet.

In an alternate example of a more sophisticated system 10 and sensors 50 where additional sensor-transmitted data is received and analyzed, one or more of the sensor 50 ID, battery life of the sensor 50, temperature, revolution data and other conditions can be analyzed by tool 80 and controller/processor 56 and monitoring station 90. For example, by checking the sensor ID, it can be verified that the tire has not been changed and is in the same location on the vehicle 16 when it last left the rental facility. If the tire was abused or damaged and the vehicle's spare tire has been put on, the system 10 will detect this vehicle condition and further inspect the vehicle. If the original tires on the vehicle 16 have been stolen, the sensor 50 IDs won't match the previously recorded data for that vehicle 16. If the sensor has been removed or stolen, no signal will be transmitted and an abuse or theft immediately identified. If a tire's temperature is higher than a normal range, that may signal a defect or hazardous condition of the tire requiring a closer inspection or replacement to prevent a breakdown of the vehicle 16 in the field requiring road service. If the sensor 50 has low battery life remaining, the TPMS sensor can be scheduled to be changed at the next regularly scheduled service time. Other conditions, analyses, comparisons known by those skilled in the field using the above described equipment may be used. It is further understood that first 110 and second 120 stations may be a single station or divided into additional stations to suit the particular application and level of inspection.

Referring to FIG. 1, an optional tire profile or tread sensor 100 is also used on each side of the vehicle 16 path of travel 20. Tire profile sensors can be similarly used to automatically inspect the profile or tread 40 of each tire 30 that passes through a beam or field of vision 106 of each sensor. The sensors 100 are similarly placed in electronic communication with the tool 80, controller/processor 56 and monitoring station 90 as described above. In the example, tire profile sensors 100 scan or read an image of the tire tread for predetermined inspection parameters, for example, to identify if the tread wear has reached a low level and requires replacement with a new tire, a different tire has been placed on the vehicle possibly indicating abuse or theft, or other conditions known by those skilled in the art. An example of sensor 100 may use lasers to scan or read the tire tread. Appropriate software would be used to read the scanned data to identify the tire manufacturer, model of tire and possibly other tire information known by those skilled in the art. In one example, the tread sensor 100 may include a manual override or bypass if a tire to be scanned includes debris on the tread, for example mud or snow, which prevents an accurate scan/read of the tire by the laser or visions systems. Alternate examples may employ a vision system where cameras or other image capturing devices are used. It is understood that additional inspection equipment (not shown) for use in inspecting conditions of tires known by those skilled in the art can be used in system 10.

In an example not shown, the tool 80, whether stationary or in a portable or handheld device form, include features which measure and take into account the absolute air pressure for more accurate readings under the location and environmental conditions. In another example not shown the tool 80 measures the environmental temperature, the temperature of the vehicle tire air pressure and/or temperature of the tire rubber for more accurate readings and data. In one example, a processor in the tool compensates for the measured absolute pressure or temperatures for more accurate assessment and accurate data for the technician or user. These exemplary features are descried in U.S. patent application Ser. No. 13/687,000 filed Nov. 28, 2012 which are incorporated herein by reference.

In FIG. 1, an exemplary third station 130 is shown sequentially following second station 102. Following inspection at the first 110 and second stations 120, vehicles that pass or have conditions within the predetermined standards can return to the fleet or proceed along for further processing or inspection as desired by the user, for example rental fleet or taxi service. If an identified condition by system 10 requires further inspection or repair, the vehicle 10 can be transferred or re-routed to the appropriate area for further inspection or repair. It is understood that third station 130 can be combined with second station 102 or that one or more of the inspections or equipment from station 110 or 120 can be placed in station 130 to suit the particular application.

Figure 2:
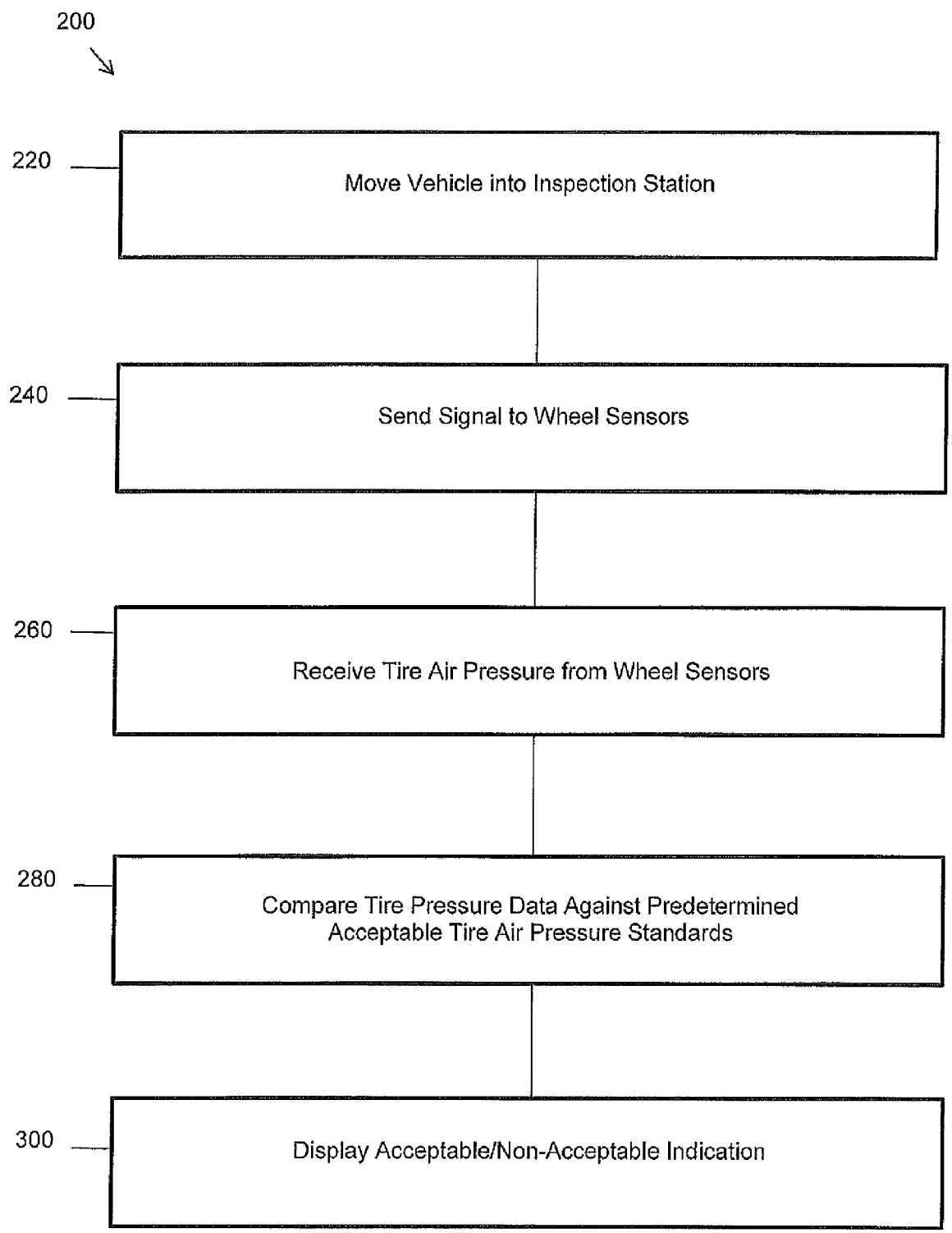
FIG. 2 is a schematic flow chart of one example implementation of the vehicle tire monitoring system where tire pressure is checked along the exemplary vehicle passageway.

Referring to FIG. 2, an example of a process 200 for inspecting vehicular tires for use in, for example a car rental return lane or area, is illustrated. In the example, the exemplary application is a car rental return lane or area and an exemplary procedure of simply checking or inspecting the tire air pressure in each tire similar to that described using FIG. 1.

In the example process 200, the first step 220 is to move a vehicle returning from use in the field into an inspection station, for example a designated path or area 20 having station 110 shown in FIG. 1. Where the specific identification of the vehicle is not required, the inspection station for step 220 may be the second station 120 and into the field of vision or through the beams of TPMS sensors 80 as described above. Although process 200 is described as being used when a vehicle 16 returns from the field, it is understood that process 200 and the equipment shown in FIG. 1 can also be used and/or repeated when a vehicle has been idle or is ready to go into use in the field. For example, before a rental car or taxi is provided to a customer or driver, a rental or taxi facility may use the system 10 and process 200 just prior to the customer or driver taking delivery and using the vehicle to ensure, for example, a tire has not leaked air pressure below an acceptable level overnight or since the vehicle returned to the facility and passed inspection. Other uses of the system 10 and process 200 known by those skilled in the art may be used.

In exemplary step 240, the vehicle 16 is driven or positioned so the front and rear tires 30 sequentially pass by, or are momentary stopped in the field of vision or in sufficient proximity, so the wheel sensors 50 sequentially receive the signal transmitted from TPMS tools 80. The TPMS wheel sensors 50 measure predetermined conditions of the tire 30, for example tire air pressure, and in step 260 transmit a data signal in a manner described above for receipt by the adjacent tool 80.

In step 280, the received sensor transmitted data signal is compared to a predetermined standard or range stored in memory in the tool 80, in a controller/processor 56 or some other remote device, to determine if the tire condition, in this example tire pressure, is within acceptable bounds for continued service. As described for FIG. 1 above, additional data or ranges, for example historical data for that particular tire for a particular measured condition, can be compared or analyzed depending on the application or needs of the facility/user. It is understood that other conditions may be checked as previously described.

In step 300, the results of the comparison of the measured pressure against the acceptable standard are displayed on the tool 80 or other device, for example a remote monitoring station 90 for a technician or other operator to quickly review and determine if the vehicle remains acceptable for continued service. It is understood that in the most simplistic system, the measured tire pressure from the sensor 50 may be transmitted directly to a visual display for a technician without comparison to an acceptable range, but just viewed and analyzed by the technician. For example, the measured pressure of a tire 30 at 32 psi could just be read by tool 80 and displayed on a monitor or at a remote monitoring station 90 where the technician approves as an acceptable pressure. The vehicle 16 is then moved out of the station for further processing or returned to the fleet depending on the facility. It is understood that process 200 can be used for other applications other than rental car or taxi facilities as understood by those skilled in the art.

Figure 3:
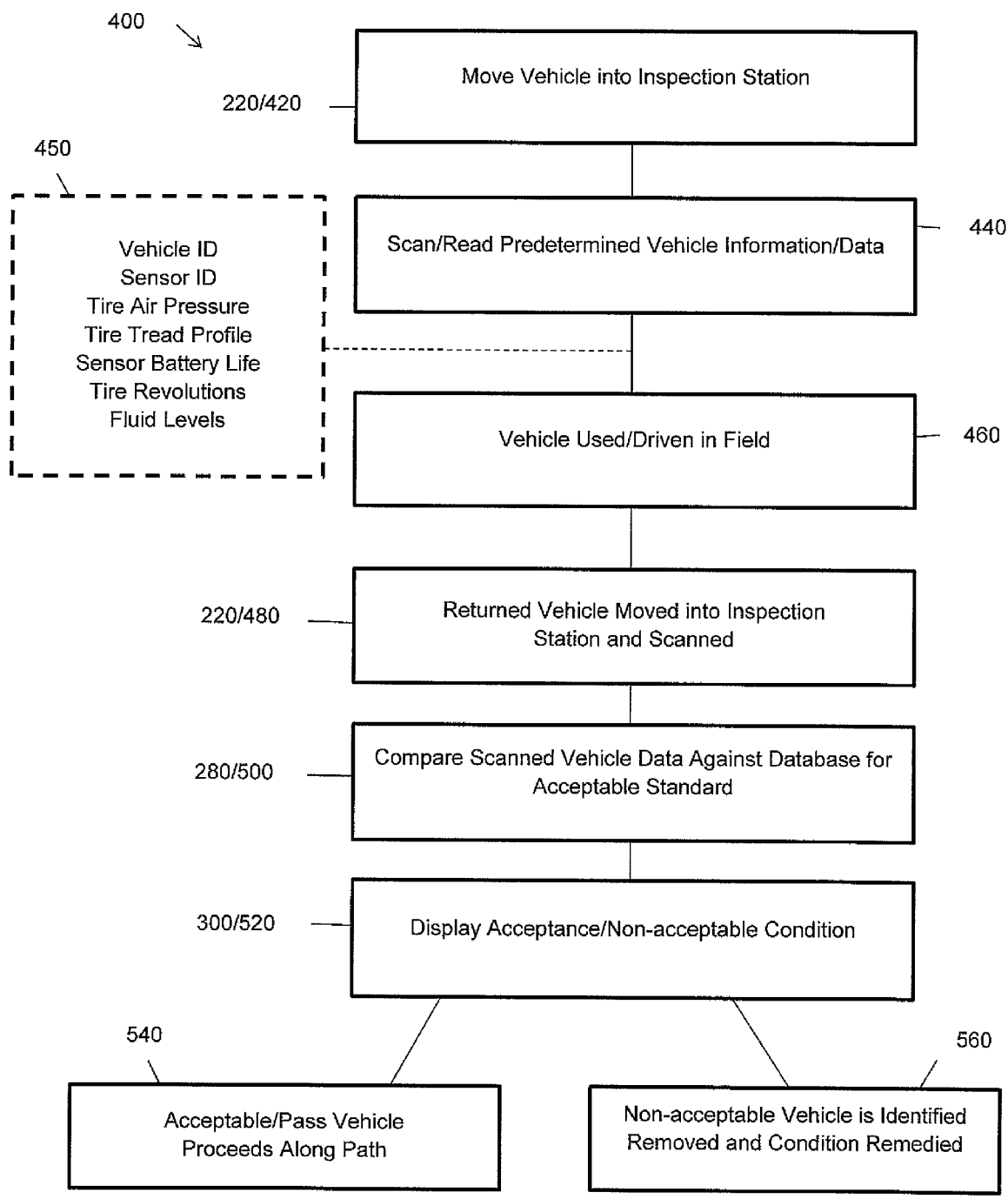
FIG. 3 is an alternate schematic flow chart of FIG. 2 showing an example process where vehicle inspection takes place before and after a vehicle is used in the field.

Referring to FIG. 3, an alternate example of a process 400 for inspecting vehicle tires shown in FIG. 2 is illustrated. In step 420, a vehicle 16 is moved into an inspection station along a path of travel 20 as described for step 220 in FIG. 2. In this station, however, the vehicle identification is scanned or read in step 440 in any manner as described above, for example a hand held scanner to read the vehicle 16's VIN number or license plate. This step 440 can typically be performed when the vehicle 16 leaves an area, for example the third station 130 shown in FIG. 1 at a car rental facility before it is allowed to pass into the field so positive data of which vehicle 16 has left is recorded.

In an optional step 450 additional information can be recorded, for example when the vehicle 16 is moved through a second station 120 and, for example, tools 80 and 100 are used to scan and record tire conditions described above before the vehicle 16 leaves the facility for use in the field in step 460. Other vehicle systems and components, for example fluid levels and components subject to wear, may be checked/monitored and/or compared to pre-stored acceptable ranges and historical data in the manner described above.

In step 480, the vehicle 16 on returning from use in the field enters the return lane or area in station 110 as described in step 220 above.

In step 500, the data transmitted by the sensor 50 to tool 80 is compared in a manner generally described in step 280. As described above, if multiple sensor data, for example tire pressure, temperature and sensor ID is measured and transmitted, each type of data or measurement is compared to a respective range or data preferably stored in memory in electronic communication with a controller/processor 56 or other device. The type and level of comparison and analysis is dependent on the application and equipment used.

In step 520 the results of the comparison are displayed on a visual display or monitoring station where a technician is situated as described for step 300 above. It is understood that other pass/fail indicators may be used such as sounds and other perceptible indicators.

In step 540, if the inspection results are within acceptable levels, the vehicle is passed/approved and proceeds to the next inspection as determined by the fleet owner or is returned to the fleet.

If a measured tire condition falls outside of the predetermined range, or a sensor 50 is not detected, or information received is not consistent with the data recorded in step 440 when the vehicle left the facility, a warning or cautionary indicator is displayed or otherwise made known in step 560 so a technician can further investigate the problem and/or initiate a remedy so the vehicle can return to the fleet or taxi route as quickly as possible. In most situations, the vehicle would be removed from the process of returned to the fleet until the condition is remedied. It is understood that additional steps or the reordering of steps may take place to suit the particular application and vary the inspection as known by those skilled in the art without deviating from the present invention.

Figure 4:
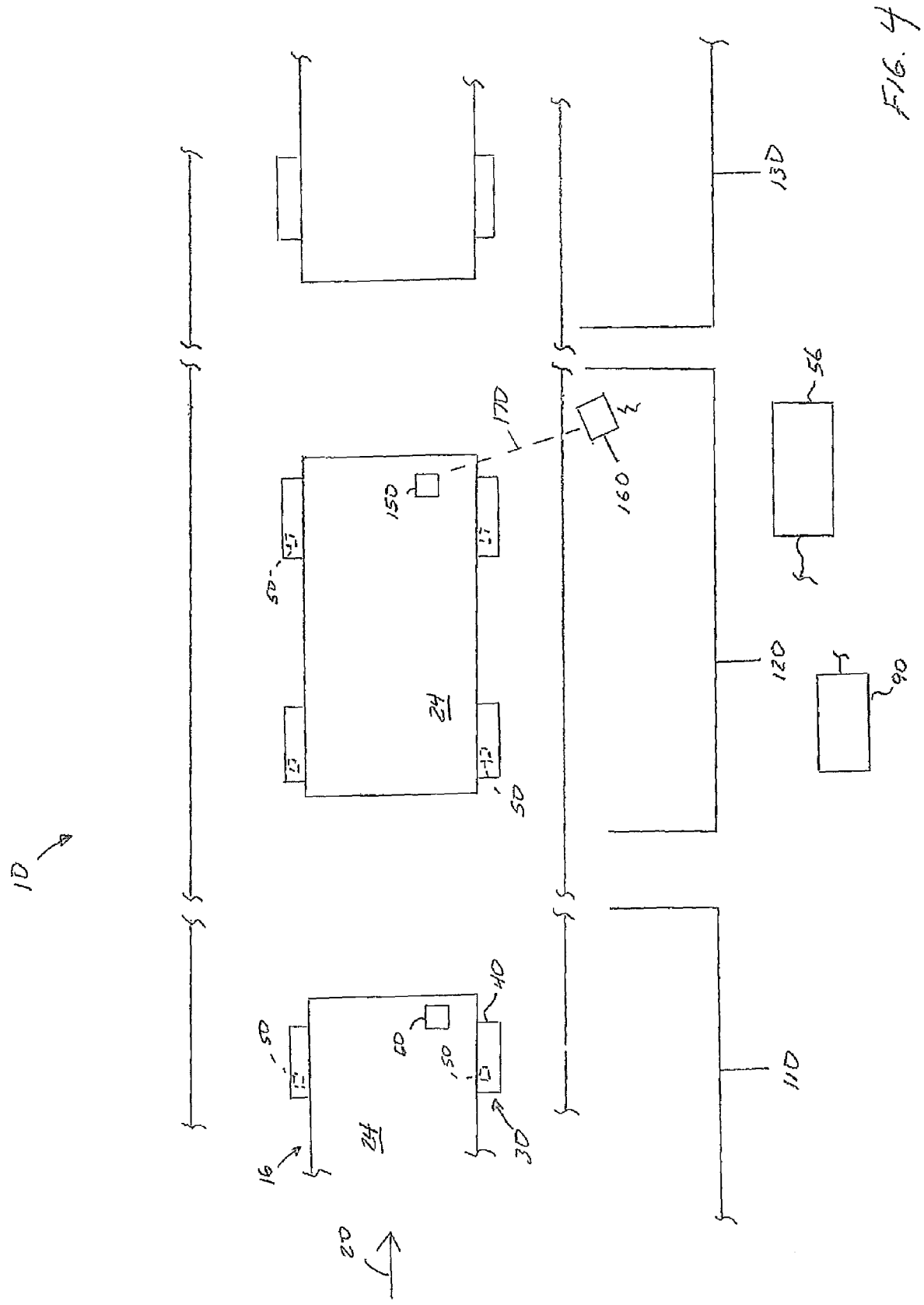
FIG. 4 is an alternate schematic plan view of the example vehicle passageway shown in FIG. 1.
Figure 5:
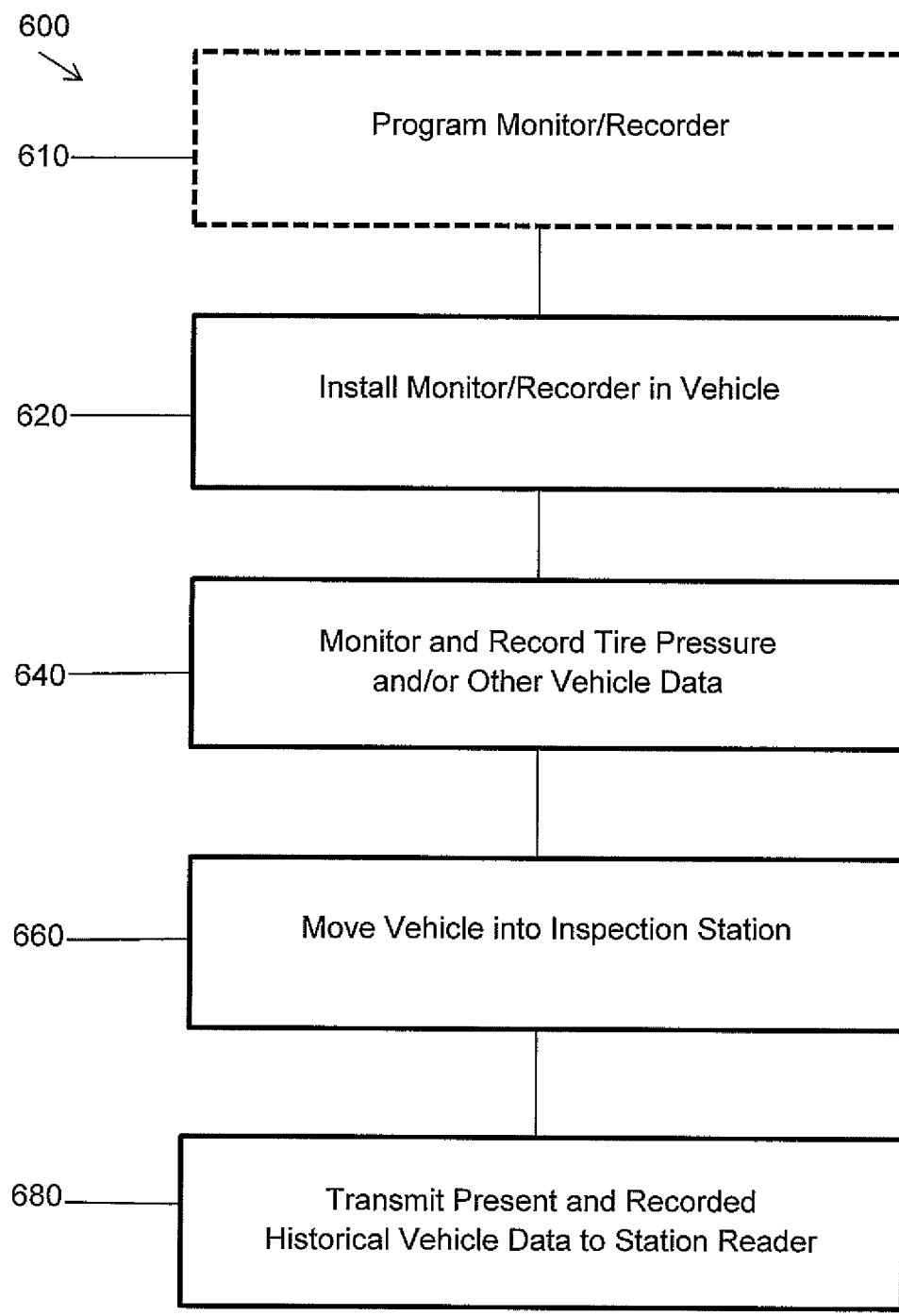
FIG. 5 is a schematic flow chart of an alternate example of FIGS. 2 and 3 where tire pressure and optionally other conditions are retrieved from an example of an onboard device.

Referring to FIGS. 4 and 5, an alternate example of the devices and processes described above are illustrated. Components having the same general features and functions previously described have the same numbers as the prior Figures.

Referring to FIG. 4, a small monitoring device 150, which preferably has recording and electronic data storage capabilities, is installed on-board the vehicle 16 in a convenient location. The monitoring device 150 can periodically or continuously monitor a plurality of vehicle data, for example, tire air pressure through communication with the TPMS sensors 50 in the wheels as described above. The device 150 can monitor and record other vehicle data as described above.

With the tire and possibly other vehicle data received and stored on the device 150, on the vehicle entering the return line path 20 and one or more vehicle stations 110, 120 and 130, the monitored and recorded vehicle data can be centrally retrieved from device 150. In one example, a single reader 160 may be positioned in a station, versus at least two readers 80 positioned on opposite sides of the path 20 to retrieve the tire pressure data shown in FIG. 1. This reduces the number of equipment and capital investment required for the system 10 as previously described. It is understood that one or more of the sensors and features described in FIG. 1 may also be used with device 150 to meet the specific application and as known by those skilled in the art.

In one example, the device 150 and reader 160 operate on radio frequency (RF) versus the typical low frequency (LF) signals used in TPMS systems. A benefit of using RF is the extended range of transmission and reception over LF. In the example shown in FIG. 4, on entrance of the vehicle 16 into the inspection station, the reader 160 may send a RF signal to the monitoring/recording device 150 to initiate gathering and transmission of the present or previously recorded vehicle data that was monitored and recorded by the device 150. Due to the extended RF range of the device 150 and reader 160, the reader may be logistically further away in a more sheltered or convenient position in the inspection station. The reader 160 may then analyze the data or further transmit the data to the central controller 56 or monitoring station 90 as previously described to alert a human operator of the vehicle conditions. Other devices and methods of communication between the device 150 and reader 160 known by those skilled in the art may be used.

FIG. 5 illustrates an alternate process 600 for inspecting vehicles in a high volume environment corresponding to the device 150 and reader 160 as described and illustrated in FIG. 4. In the example, a first step 620 would involve installation of the device 150 into the vehicle 16. The location of device 150 in the vehicle 16 may be in many areas to suit the particular vehicle 16 or the application and function with the reader 160 and overall system 10. In one example, the device 150 can be hidden from a users view and secured in a protected area. Alternately, the device 150 could include a user visual display and display real or substantially real-time data retrieved from the vehicle 16 to keep the user apprised of vehicle conditions. Alternately, the device 150 can include electronic communication ports for communication with the vehicle 16 existing systems, for example the vehicle electronic control unit (ECU) through the OBDII port or connection in the vehicle 16. Other locations for the device 150 on-board the vehicle 16 known by those skilled in the art may be used.

In an optional step 610, the device 150 prior to installation on-board the vehicle 16, can be initially programmed or reprogrammed if already in use. In one example on an initial or first installation, for example in a new rental car, the device 160 can be loaded with data particular to that vehicle, for example the VIN number, the TPMS sensor 50 IDs and other data parameters specific to that vehicle. The information can be manually input through a user interface on the device 150 if so equipped or uploaded from a personal computer or other device through a USB port or other data port on the device 150 known by those skilled in the art.

Once programmed and installed on the vehicle 16, the device 150, as it is selectively programmed to do, will continuously or periodically monitor and if so equipped, record and electronically store, vehicle data, for example tire air pressure in step 640. As noted above, many other vehicle data types can be monitored and recorded depending on the required application and sophistication of the sensors and readers.

In step 660, on return of the vehicle 16 to the inspection system 10, for example in a rental car return facility, the reader 160 will send a signal 170 to the device 150 to initiate the process for the device 150 to gather and transmit the present or recorded vehicle data, for example tire air pressure, to the reader 160 in step 680 for further processing as described above. As noted, preferably, the signal transmissions used by the device 150 and 160 are RF, but other, as well as multiple, forms of communication may be used. In additional steps (not shown) the data received by reader 160 can be further processed or transmitted for further analysis and electronic storage for historical data purposes as described above.

Depending on the level of vehicle data needed for the inspection application, it is conceivable that with use of the central, on-board device 150 and reader 160, a single inspection station, with a minimal amount of readers and other devices, may be employed.

As noted above, the number of steps and organization of steps in process 600 may be used as known by those skilled in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An inspection system for use in inspecting one or more operating conditions of a high volume quantity of transportation vehicles, the system comprising:
   a path of travel for through passage of a high volume quantity of transportation vehicles;
   an inspection station positioned along the path of travel;
   a plurality of vehicle operating condition sensors comprising a tire pressure monitoring system tire air pressure measuring sensor connected to each vehicle wheel in pressurized air communication with an interior of a respective pneumatic tire, the plurality of tire air pressure measuring sensors including a first tire air pressure measuring sensor configured to transmit a sensor first measurement of tire air pressure on a first passage of the first tire air pressure measuring sensor through the inspection station at a first time and a sensor second measurement of tire air pressure on a second passage of the first tire air pressure measuring sensor through the inspection station at a second time subsequent to the first time;
   a tire pressure monitoring system tool physically unconnected and independent of the plurality of tire air pressure measuring sensors, the tire pressure monitoring system tool comprising a first tire pressure monitoring system tool stationarily mounted on a first side of the path of travel and a second tire pressure monitoring system tool stationarily mounted on a second side of the path of travel opposite the first side in the inspection station, wherein each of the first and the second tire pressure monitoring system tools configured to receive a tire air pressure measuring sensor first sensor measurement of the tire air pressure operating condition and a tire air pressure measuring sensor second sensor measurement of the tire air pressure operating condition from the respective tire pressure monitoring system tire air pressure measuring sensor passing through a respective tire pressure monitoring system tool data communication beam;
   an electronic data memory storage device physically unconnected and independent of the tire air pressure measuring sensors in data communication with the first and the second tire pressure monitoring system tool to electronically store in the memory storage device the tire air pressure measuring sensor first measurement data of the tire air pressure operating condition and the tire air pressure measuring sensor second measurement data of the tire air pressure operating condition at the respective first and second times;
   a data processor physically unconnected and independent of the tire air pressure measuring sensors and in data communication with the memory storage device for comparing the tire air pressure measuring sensor first measurement of the tire air pressure operating condition and the tire air pressure measuring sensor second measurement of the tire air pressure operating condition; and
   an indicator device in electronic communication with the processor adapted to signal a user to a predetermined condition following the tire pressure monitoring system tool comparison of the tire air pressure measuring sensor first measurement data of the tire air pressure operating condition and the tire air pressure measuring sensor second measurement data of the tire air pressure operating condition.

2. The inspection system of claim 1 wherein-one of the vehicle operating conditions comprises a unique vehicle identification, the inspection system further comprising:
   a vehicle identification tool positioned in the inspection station upstream along the path of travel from the tire pressure monitoring system tool, the vehicle identification tool operable to scan a unique vehicle identification indicia positioned on the vehicle positioned in the inspection station and transmit the scanned unique vehicle identification to the electronic data memory storage device on each vehicle passage through the inspection station.

3. The inspection system of claim 2 wherein the data processor is further configured to compare the previously stored in memory first tire air pressure measuring sensor first measurement of the tire air pressure operating condition and the sensor second measurement of the tire air pressure operating condition for the scanned unique vehicle identification indicia.

4. The inspection system of claim 3 wherein the inspection station comprises a first inspection station and a second inspection station positioned along the path of travel downstream from the first inspection station, wherein the vehicle identification tool is positioned in the first inspection station and the tire pressure monitoring system tool is positioned in the second inspection station, wherein the scanned unique vehicle identification is received and stored in the data memory storage device prior to a next measurement of tire air pressure in the second inspection station.

5. The inspection system of claim 1 wherein the electronic data memory storage device further comprises predetermined acceptable levels data for the tire air pressure measuring sensors, the data processor is further operable to compare at least one of the first tire air pressure measuring sensor first measurement of the tire air pressure operating condition or the sensor second measurement of the tire air pressure operating condition against the predetermined acceptable levels for the tire air pressure measuring sensors.

6. The inspection system of claim 1 further comprising: a vehicle tire tread sensor physically unconnected to the vehicle and positioned in the inspection station along the path of travel, the tire tread sensor having a scanning device configured to scan at least a portion of an exterior tread of each tire connected to the transportation vehicle positioned in the inspection station for transmitting tire tread data to the data processor.

7. The inspection system of claim 1 wherein the indicator device is a visual display device for visually displaying one of the first tire air pressure measuring sensor first sensor measurement of the tire air pressure operating condition and the second sensor measurement of the tire air pressure operating condition or a variance between the first and the second sensor measurements of the tire air pressure operating condition.

8. The inspection system of claim 1 wherein one of the vehicle operating conditions includes vehicle operating fluid levels, the inspection system further comprising:
    a vehicle operating fluids sensor for sensing the level of a vehicle operating fluid.

\* \* \* \* \*